(12) United States Patent
Goldberg et al.

(10) Patent No.: US 6,603,791 B2
(45) Date of Patent: Aug. 5, 2003

(54) HIGH POWER FIBER AMPLIFIERS WITH PASSIVE PUMP MODULE ALIGNMENT

(75) Inventors: Lew Goldberg, Fairfax, VA (US); Marc Le Flohic, Saint Quey Perros (FR)

(73) Assignee: Keopsys, Inc., Fairfax, VA (US)

( * ) Notice: Subject to any disclaimer, the term of this patent is extended or adjusted under 35 U.S.C. 154(b) by 0 days.

(21) Appl. No.: 09/733,988

(22) Filed: Dec. 12, 2000

(65) Prior Publication Data

US 2002/0071460 A1 Jun. 13, 2002

(51) Int. Cl.⁷ .............................................. H01S 3/097
(52) U.S. Cl. ............................ 372/81; 372/18; 372/22; 372/34
(58) Field of Search .............................. 372/18, 22, 34; 257/461; 385/88, 72

(56) References Cited

U.S. PATENT DOCUMENTS

| | | | |
|---|---|---|---|
| 4,815,079 A | | 3/1989 | Snitzer et al. ................. 372/6 |
| 5,256,327 A | * | 10/1993 | Allen et al. .................... 372/22 |
| 5,701,319 A | * | 12/1997 | Fermann ....................... 372/18 |
| 5,737,467 A | * | 4/1998 | Kato et al. ..................... 385/92 |
| 5,852,696 A | * | 12/1998 | Collins et al. ................. 385/88 |
| 5,854,865 A | | 12/1998 | Goldberg ...................... 385/31 |
| 6,130,902 A | * | 10/2000 | Shimoji ........................ 372/34 |
| 6,146,025 A | * | 11/2000 | Abbink et al. ................. 385/88 |
| 6,340,831 B1 | * | 1/2002 | Kuhara et al. ............... 257/461 |

OTHER PUBLICATIONS

Shuji Mononobe, et al., "Fabrication of a Pencil–Shaped Fiber Probe for Near–Field Optics by Selective Chemical Etching", Journal of Lightwave Technology, vol. 14, No. 10, Oct. 1996, pp. 2231–2235.

J.D. Minelly, et al., "Efficient Cladding Pumping of an Er3+ Fibre", Proc. 21st Eur. Conf. on Opt. Comm, ECOC 1995, pp. 917–920.

P. Bousselet, et al., "+ 26 dBm Output Power From an Engineered Cladding–Pumped Yb–Free EDFA for L–Band WDM Applications", Alcatel Corporate Research Centre, OFC 2000, pp. 114–116.

Piotr Myslinski, et al., "Effects of Concentration on the Performance of Erbium–Doped Fiber Amplifiers", Journal of lightwave technology, vol. 15, No. 1, Jan. 1997, pp. 112–119.

J.E. Townsend, et al., "yb3+ Sensitised Er3+ Doped Silica Optical Fibre With Ultrahigh Transfer Efficiency and Gain", Electronics letters, Oct. 10, 1991, pp. 1958–1959.

Martin E. Fermann, et al., "Single–Mode Excitation of Multimode Fibers with Ultrashort Pulses", Optics Letters, vol. 23, No. 1, Jan. 1, 1998, pp. 52–54.

* cited by examiner

Primary Examiner—Paul Ip
Assistant Examiner—Tuan Nguyen
(74) Attorney, Agent, or Firm—Dorsey & Whitney LLP

(57) ABSTRACT

A hermetically sealed pump module for use with fiber devices is disclosed. The method and apparatus disclosed enable a pump module to be constructed that has a high coupling tolerance and which is inexpensive and easy to manufacture. The pump module may comprise a transparent window through which a pump beam is coupled from a laser diode into the inner cladding of a double cladding fiber. The transparent window also may serve as a substrate for the inner cladding of the double cladding fiber. The laser diode is sealed within the pump module housing with a lid and the window, which is bonded to the lid. The housing may contain a heat sink, heat-spreading sub-mount and a Peltier cooler.

47 Claims, 12 Drawing Sheets

HIGH POWER FIBER AMPLIFIERS WITH PASSIVE PUMP MODULE ALIGNMENT

FIELD OF THE INVENTION

The present invention relates to fiber optics, and more particularly to high power fiber amplifiers and lasers and devices for optically pumping these in order to create a population inversion within an active medium of such amplifiers and/or lasers.

BACKGROUND OF THE INVENTION

Double cladding fiber structures, as described in U.S. Pat. No. 4,815,079 to Snitzer, et al., have been demonstrated to be an effective approach for implementing high power fiber lasers and amplifiers. See L. Goldberg et al., "Highly efficient 4-W Yb-doped fiber amplifier pumped by a broad stripe laser diode," Optics Letters, v. 15, pp. 673–675, 1999. In a double cladding fiber a single mode doped core is surrounded by a large, multimode inner cladding, which is in turn surrounded by an outer cladding. To achieve a large numerical aperture (NA) in the inner cladding, an outer cladding with a low refractive index is chosen, typically resulting in an inner cladding NA of 0.25–0.6. Typical inner cladding diameters are 100–200 $\mu$m to allow efficient coupling of emission from 100–200 $\mu$m wide, high power, broad stripe laser diodes. Compared with conventional single mode fiber amplifiers, the double cladding fiber offers several important advantages. First, high power non-diffraction limited laser diodes, such as broad area diodes can be used to pump the fiber. Such diodes can generate 2–4 W from a 100 $\mu$m–200 $\mu$m aperture, compared with 100–200 MW available from single mode pigtailed diodes used to pump conventional fiber amplifiers. Second, since in double cladding fibers the pump light is coupled into a large, multimode inner cladding, the diode-to-fiber alignment tolerance is at least one order of magnitude larger than that associated with single mode diode pigtailing.

An effective method for coupling the emission of a broad area pump diode into the inner cladding of a double cladding fiber is through a v-groove fabricated into the fiber, as shown in U.S. Pat. No. 5,854,865, entitled "Method and apparatus for side-pumping of optical fiber" to Goldberg. The method makes it possible to couple the pump light directly into the fiber with high efficiency. See L. Goldberg et al., "Highly efficient 4-W Yb-doped fiber amplifier pumped by a broad stripe laser diode," Optics Letters, v. 15, pp. 673–675, 1999. The method can be implemented with or without using any lenses between the diode and the fiber. See L. Goldberg et al. "Double cladding fiber amplifiers with lens-less side-pumping," paper CFC1, CLEO, 2000. FIG. 1a shows such a lens-less coupling arrangement, where the fiber is attached to a glass substrate, typically 200 $\mu$m thick, to provide mechanical support for the fiber. Light incident on the v-groove facets undergoes total internal reflection at the glass-to-air interface and is coupled in both directions into the fiber. The broad stripe diode is oriented with its junction plane perpendicular to the longitudinal fiber axis so that light is incident on the right and left v-groove facets at angles less than 45 degrees relative to the facet surface. This is below the critical angle of 47 degrees required for total internal reflection at a surface of Silica with a refractive index of 1.46. Because the beam diverges rapidly as it propagates through the diode-to-substrate air gap, the glass substrate, and the fiber, it overfills the v-groove, resulting in a decrease of the coupling efficiency. For a typical substrate thickness of 200 $\mu$m and a fiber diameter of 130 $\mu$m, a coupling efficiency of only 40% has been achieved in a lens-less coupling arrangement. See L. Goldberg et al. "Double cladding fiber amplifiers with lens-less side-pumping," paper CFC1, CLEO, 2000. This compares unfavorably with a coupling efficiency of approximately 90% demonstrated when a microlens was used between the diode and the fiber. See L. Goldberg et al., "Highly efficient 4-W Yb-doped fiber amplifier pumped by a broad stripe laser diode," Optics Letters, v. 15, pp. 673–675, 1999. Using improvements described in this invention, the coupling efficiency for the lens-less arrangement can be increased substantially and the method can be used to construct a hermetically sealed pump module.

SUMMARY OF THE INVENTION

The present invention comprises an apparatus of and a method for constructing fiber amplifiers and lasers with hermetically sealed laser diode pump modules and passive mechanical alignment of all critical components. An embodiment of the present invention uses a double cladding fiber and a v-groove side-pumping technique that directly couples pump light into the fiber without the use of lenses. The method and apparatus of an embodiment of the present invention hermetically seals the pump diode by having the transparent substrate on which the fiber is mounted also serve as the package window.

Under certain conditions, as described herein, the package window serves to transmit pump light from the diode to the fiber, while greatly reducing the diode beam divergence. This allows efficient coupling of the diode light into the fiber without using lenses, normally required to capture and focus the highly divergent light generated by a laser diode. The large alignment tolerances associated with coupling the pump light into a large multimode fiber cladding are much greater than those associated with single mode diode pigtailing. This large alignment tolerance, in conjunction with the simplified method of coupling the pump light into the double cladding fiber, makes it possible to fabricate the fiber pigtailed pump module using passive mechanical alignment. These improvements make it possible to avoid resorting to active alignment methods associated with fabrication of single mode pump modules. The pump packaging method and apparatus described herein make provisions for achieving passive mechanical alignment of the fiber and the v-groove along all three orthogonal axis, xyz. The amplifier and pump module apparatus and construction method described herein can substantially lower the cost of fiber amplifiers. The lowered cost is particularly true for those fiber amplifiers with moderate and high power output, which with conventional pump couplings would require multiple and costly pump diode modules. Moreover, the present invention greatly increases the coupling efficiency over that previously achieved in lens-less couplings.

One of the features of an embodiment of the apparatus and method of the present invention is hermetic packaging of double cladding pump modules. By having a non-stripped section of the double cladding fiber outside the hermetically sealed pump module, the difficult problem of achieving a hermetic seal to a polymer fiber jacket or outer cladding is avoided. The packaging approach used with conventional single mode fiber pigtails, where hermetic seal is achieved by using epoxy or soldering the bare (polymer jacket removed) fiber inside a ferrule, generally cannot be used with double cladding fibers. This is because there are presently no epoxies that provide a satisfactory hermetic seal and have a refractive index substantially below that of the Silica glass (n=1.46) of the inner cladding. As is described herein, the low refractive index is usually required to maintain the high numerical aperture of the inner cladding, and to prevent leakage of the pump light from the inner cladding into the epoxy. In addition, in the disclosed design the low refractive index polymer adhesive, required to bond the fiber to a transparent substrate, is placed outside of the diode package. Such polymers are kept outside the hermetically sealed package to avoid outgassing.

Another feature of an embodiment of the apparatus and method of the present invention is direct and efficient coupling of the pump diode emission into the double cladding fiber without using lenses. By using a high refractive index window in the hermetic package, the diode beam divergence is reduced to allow coupling efficiencies above 80%. At the same time, the method allows sufficient window thickness to provide mechanical strength, and sufficiently large diode-to-window spacing to make passive alignment possible.

Another feature of an embodiment of the apparatus and method of the present invention is that the disclosed coupling and packaging provides sufficiently large alignment tolerances to allow passive mechanical alignment of all critical components. This significantly simplifies the pump module and fiber amplifier assembly process and lowers the overall manufacturing cost. The passive alignment method also makes the implementation of an automatic assembly process much easier than is possible when precise active alignment is required, as in the case of single mode fiber pigtailing. Another benefit of the large alignment tolerance is that the alignment and diode-to-fiber coupling are insensitive to thermal and mechanical perturbations.

Another feature of an embodiment of the apparatus and method of the present invention is that the disclosed package design provides a mechanical means for achieving passive alignment of the diode and the fiber.

DETAILED DESCRIPTION OF THE INVENTION

Figure 2A:
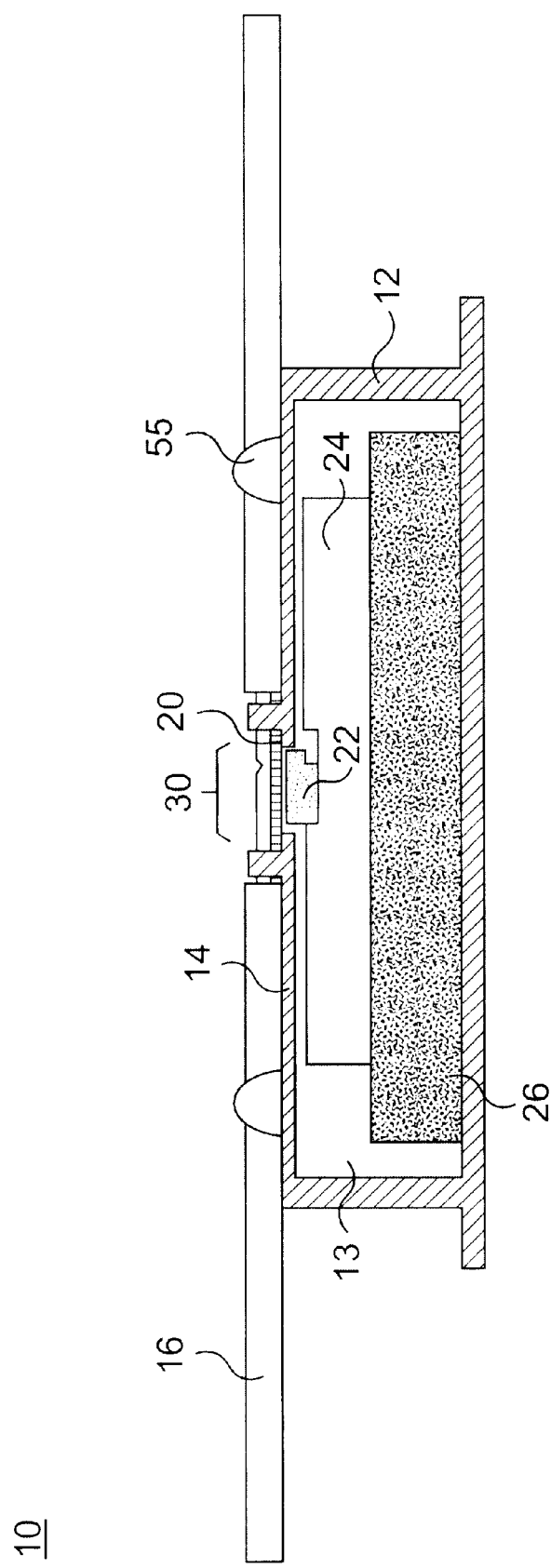
FIGS. 2a and 2b illustrate a side view and a magnified side view of a pump module according to an embodiment of the present invention.
Figure 2B:
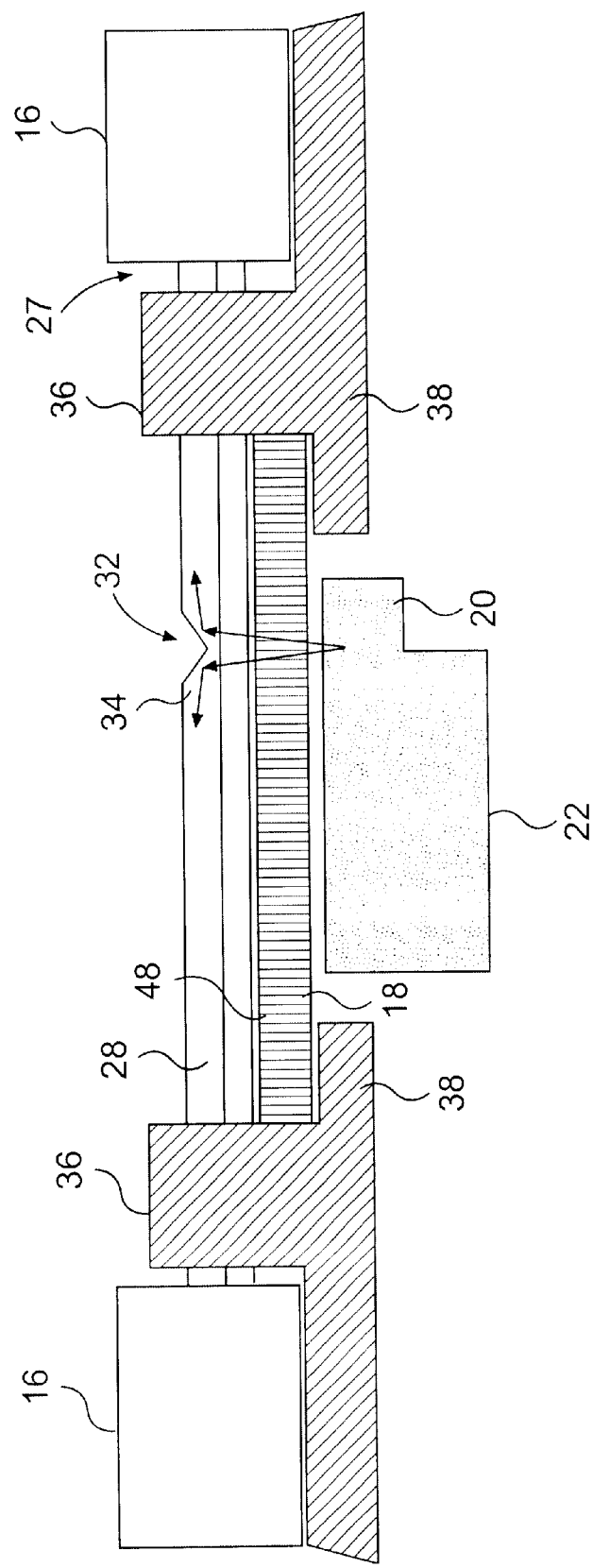

A preferred embodiment of a double cladding amplifier or pump module is shown in FIGS. 2a and 2b. The pump module/package 10 illustrated in FIGS. 2a and 2b comprises a housing 12 comprising a cavity 13, a lid 14, a transparent substrate/window 18, and, situated with the cavity 13, a laser diode 20, a laser diode heat sink 22, a heat-spreading sub-mount 24 and a Peltier cooler 26. A fiber 16 is shown secured to the lid 14. The fiber 16 shown is a double cladding fiber that has the outer cladding 27 stripped from the inner cladding 28 in a stripped section of the fiber 16. The stripped section is shown in the coupling region 30 of the pump module 10. The inner cladding 28 comprises a v-groove 32, as discussed above, for coupling the pump beam 34 into the fiber 16. The lid 14 comprises a raised ring 36 that securely positions the inner cladding 28 in the coupling region 30, as discussed in detail below, and a window support ledge 38 that supports the window 18.

Figure 1A:
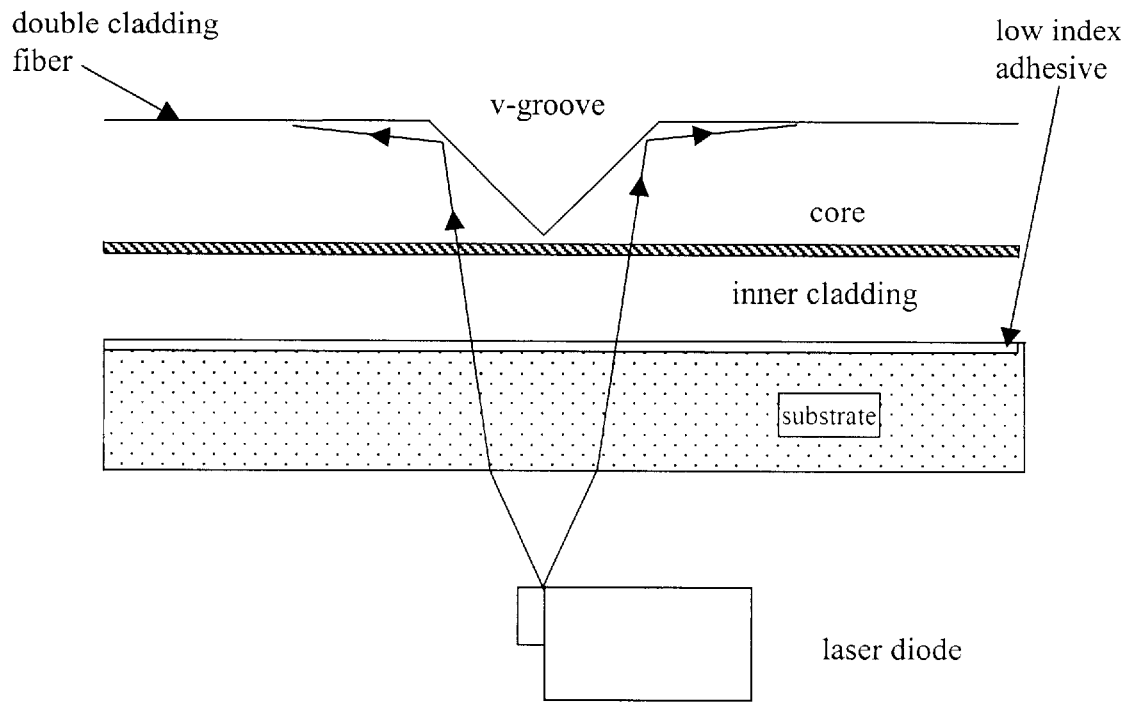
FIGS. 1a–d illustrate perpendicular and parallel cross-section views of a lens-less V-groove pump coupling.
Figure 1B:
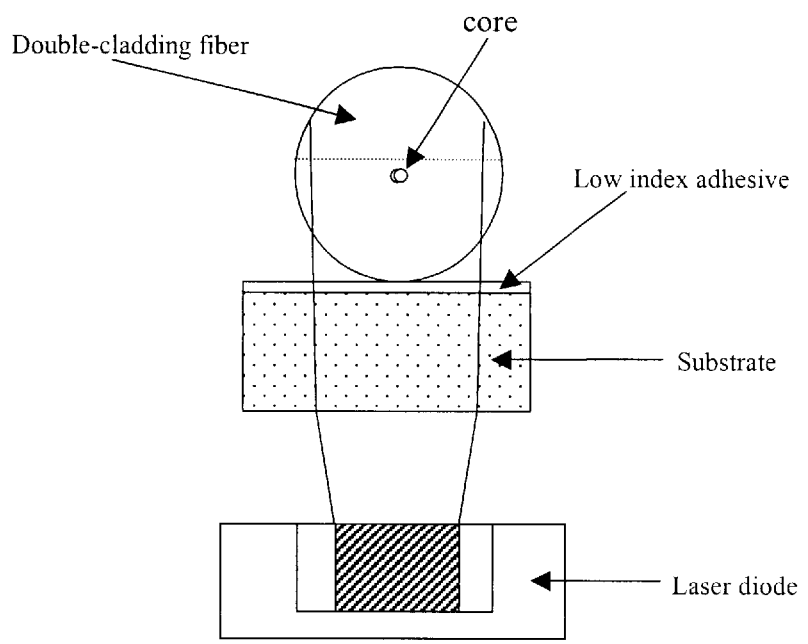

The pump coupling scheme of the present invention is similar to that shown in FIG. 1a. As already discussed, one of the drawbacks of the scheme shown in FIG. 1a is that the pump beam diverges rapidly as it propagates through the substrate and overfills the v-groove. For a diode beam divergence of 28 degrees FWHM (full width at half-maximum of the intensity), a substrate thickness of 200 μm, a substrate refractive index of 1.5, a fiber diameter of 130 μm, and a diode-to-substrate distance of 50 μm, the beam diverges to a width of 136 μm at the half intensity points. Assuming that the depth of the v-groove is 60 μm, the 120 μm wide v-groove (total of both sides for a 90 degree v-groove) will intercept diode emission over an angular range of 24 degrees. Assuming a near-Gaussian far field intensity distribution (perpendicular to the junction), typical of commonly available laser diodes, only 50% of the total power of the diode beam is contained within this range in the scheme shown in FIG. 1a. For diodes with a wider beam divergence of 40 degrees, the 24 degree angular intercept range of the scheme shown in FIG. 1a will capture only 35% of the diode emission. This fraction will be further reduced when a circular fiber is used, as shown in FIGS. 1a and 1b. That shape results in a smaller v-groove depth near the fiber edges. Consequently, the maximum intercept angle is smaller for the portion of the laser diode beam which is generated near the edges of the laser diode active stripe and which is incident on the v-groove sections near the fiber edges.

Figure 1C:
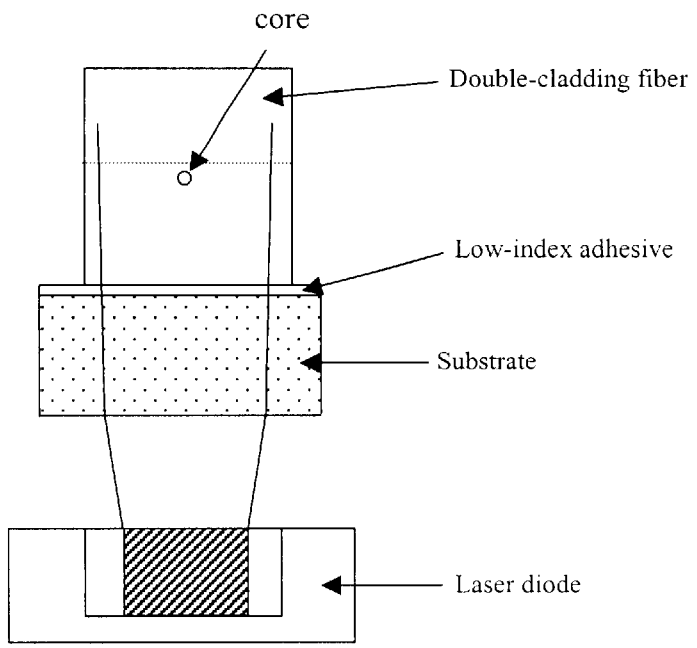
Figure 1D:
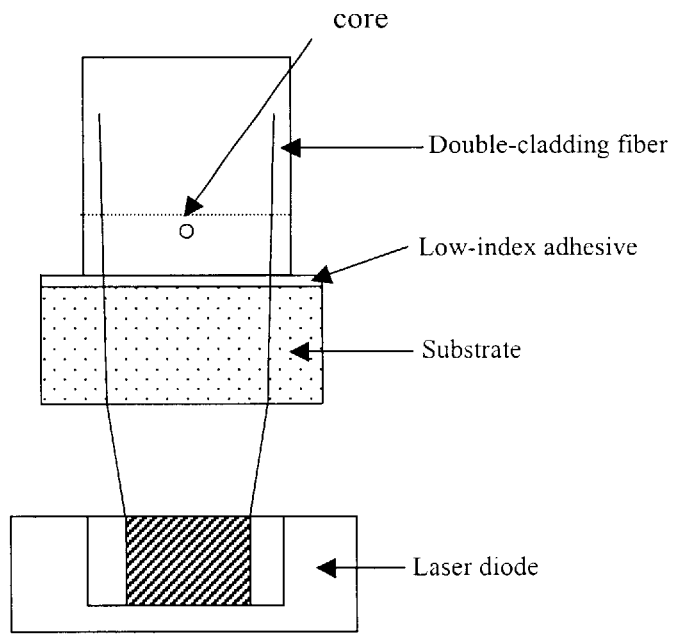

To improve the coupling efficiency, several modifications to the coupling arrangement can be made. First, to increase the intercept area, a double cladding fiber with a square or rectangular inner cladding cross-section can be used. As shown in FIG. 1c a square shaped fiber substantially (by a factor of 1.27) increases the intercept area and assures constant angular capture range across the whole diode beam. This increase results in a slight decrease in the fiber pump absorption coefficient, which is proportional to the area ratio of the doped core to the inner cladding. Alternately, a square shaped (or other shapes, such as circular or hexagonal) cladding with an off-center core can be used, where the core is displaced toward the substrate, as shown in FIG. 1d. This structure allows a deeper v-groove to be fabricated, increasing the intercept area and angular intercept range.

According to the present invention, as illustrated by FIGS. 2a–2b, a preferred modification to the pump-coupling scheme is to use a transparent substrate 18 with a high refractive index n (i.e., n>1.5). The divergence angle ($\theta_s$) of the pump beam 34 inside the transparent substrate 18 is given by $\theta_s$=arcsin (sin ($\theta$)/n), which for small angles becomes $\theta_s$=$\theta$/n, where $\theta$ is the pump beam 34 divergence angle outside of the substrate. In addition to a high refractive index, there are other preferred substrate attributes, dictated by the substrate's use as a window 18 in a hermetically sealed package. These preferred attributes include high mechanical strength, high transmission in the most commonly used pump wavelength bands of 810 nm, 915 nm and 980 nm, and suitability for various window-to-metal bonding methods commonly used for creating hermetic seals.

Accordingly, some suitable substrate materials for the window 18 are, for example, Sapphire (n=1.75), Lead Borosilicate glass (n=1.8), Zinc Sulfide (n=2.30), Diamond (n=2.4), and Zinc Selenide (n=2.50). Taking the example of a Diamond window 18, and assuming a v-groove coupling geometry described above, the pump beam 34 will be intercepted by the v-groove 32 over an angular range of 30 degrees, corresponding to a capture NA=sin ($\theta/2$) of 0.26. For a laser diode 20 with a 28 degree FWHM beam divergence, this angular coverage will result in capturing approximately 70% of the diode emission. Reducing the substrate thickness (e.g., less than 200 $\mu$m), and using fibers 16 with a larger cladding, achieves an even larger angular capture range and coupling efficiency. For a Diamond window 18 with a thickness of 150 $\mu$m, a fiber 16 with a 200 $\mu$m inner cladding, and a v-groove 32 with a depth of 90 $\mu$m, the capture angle increases to 40 degrees, corresponding to a NA=0.34. For a laser diode 20 with a 28 degree FWHM beam divergence, this capture angle would result in a power collection efficiency of 85%. Using diodes with a smaller beam divergence, decreasing the diode-to-substrate distance and/or further decreasing the window thickness achieves additional improvements. The diode-to-substrate distance used in the above calculations is 50 $\mu$m; the preferred diode-to-substrate distance is 50 $\mu$m or less. The minimum practical window thickness is determined by the mechanical strength of the window material and the size of the window 18.

The variation of the coupling efficiency with diode or fiber translation is affected by the size of the inner cladding 28 and the v-groove 32. With a v-groove 32 width and length greater than 100 $\mu$m, the coupling tolerance is an order of magnitude larger than for the case of single mode fiber pigtailing, where core sizes are typically in the range of 5–10 $\mu$m. The much larger alignment tolerance makes it feasible to carry out pump module assembly using passive mechanical alignment, using methods described below.

FIG. 2a shows a side view of the pump module package 10 according to an embodiment of the present invention, while FIG. 2b shows a magnified side view of the coupling region 30 of the pump module package 10 according to an embodiment of the present invention. The diode 20 is mounted on a heat-spreading sub-mount 24 that may then be attached to Peltier thermolelectric cooler 26 bonded to the bottom of the hermetic housing 12. A lid 14 attached to the top of the housing 12 seals the assembly 10. A hole in the lid 14 contains the window 18, which is placed on a window support ledge 38 surrounding the hole. To hermetically seal the housing 12, the window 18 may be bonded to the lid 14. The thickness of the Peltier cooler 26 and the heat-spreading sub-mount 24 are usually chosen so that the laser diode facet is within approximately 50 $\mu$m of the bottom surface of the window 18. To reduce reflective losses, one or both window 18 surfaces (top and/or bottom) can be anti-reflection coated.

Figure 3B:
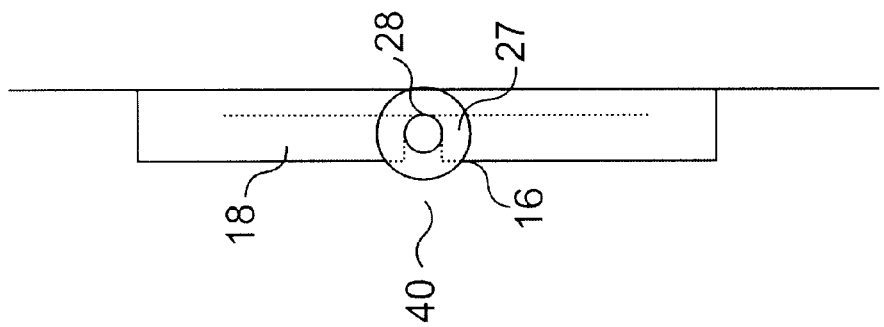
FIGS. 3a and 3b illustrate a top view and a cross-sectional side view of a coupling region and fiber alignment slots of an embodiment of the present invention.
Figure 3A:
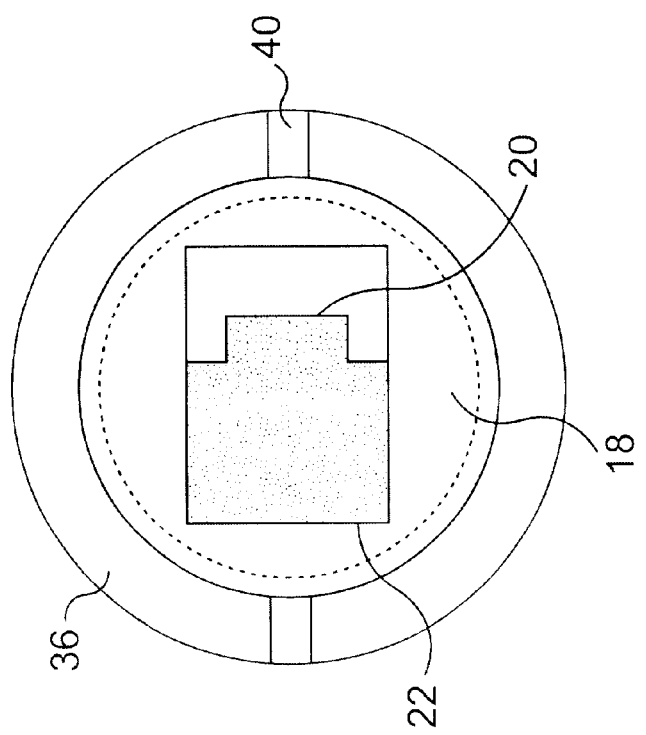

The transparent window 18 also serves as the substrate for the fiber 16; a section of the double cladding fiber 16, stripped of its jacket polymer outer cladding 27, is placed directly on the top surface of the window 18. To precisely define the lateral position the fiber 16, the fiber 16 may be inserted into precisely machined slots 40 in the raised ring 36 that surrounds the window 18, as shown in FIGS. 3a and 3b. The bottom of each slot 40 coincides with the top surface of the window 18 so that the bottom side of the fiber 16 contacts the window surface 42.

The rest of the top surface of the lid 14 is recessed as shown in FIGS. 2a–2b, so that the lid 14 coupling region 30, the stripped section of the double cladding fiber 16 may be bonded to the top surface of the window 18 using low refractive index adhesive 48, required to prevent light coupled into the inner cladding 28 from escaping. The adhesive 48 serves to immobilize the fiber 16 and to provide near-index matched path for the pump light, so that there are no significant reflections at the fiber-window interface. Ideally, the refractive index of the adhesive 48 should be equal or smaller to that of the outer cladding 27 of the double cladding fiber 16, so that the NA of the stripped section of the fiber 16 will match or be greater than the NA of the rest of the fiber 16. At the very least, in order to prevent pump light leakage into the adhesive 48, the affective NA of the bonded section should be equal or greater than the NA corresponding to the maximum v-groove 32 capture angle.

The numerical aperture of the inner cladding 28 is given by NA=n$\sqrt{2\Delta n}$ where n=1.46 is the inner cladding 28 refractive index, and $\Delta n \cong (n-n_{clad})/n$ is the normalized refractive index difference between the inner cladding 28 and outer cladding 27 or the adhesive 48. For many commercially available double cladding fibers with polymer outer cladding 27 the inner cladding 28 NA is approximately 0.45, corresponding to an outer cladding 27 refractive index of n=1.39. To avoid losses for pump light with an NA of 0.31 collected by a v-groove 32, an adhesive 48 with a refractive index of approximately 1.44 is required. Alternately, a double cladding fiber 16 with a glass outer cladding 27 can be used, so that only the fiber jacket has to be stripped from the section of the double cladding fiber 16 placed on the window 18. In this case, since the outer cladding 27 remains on the fiber 16, any transparent adhesive, regardless of its refractive index, can be used to attach the fiber 16 to the window 18.

Figure 4A:
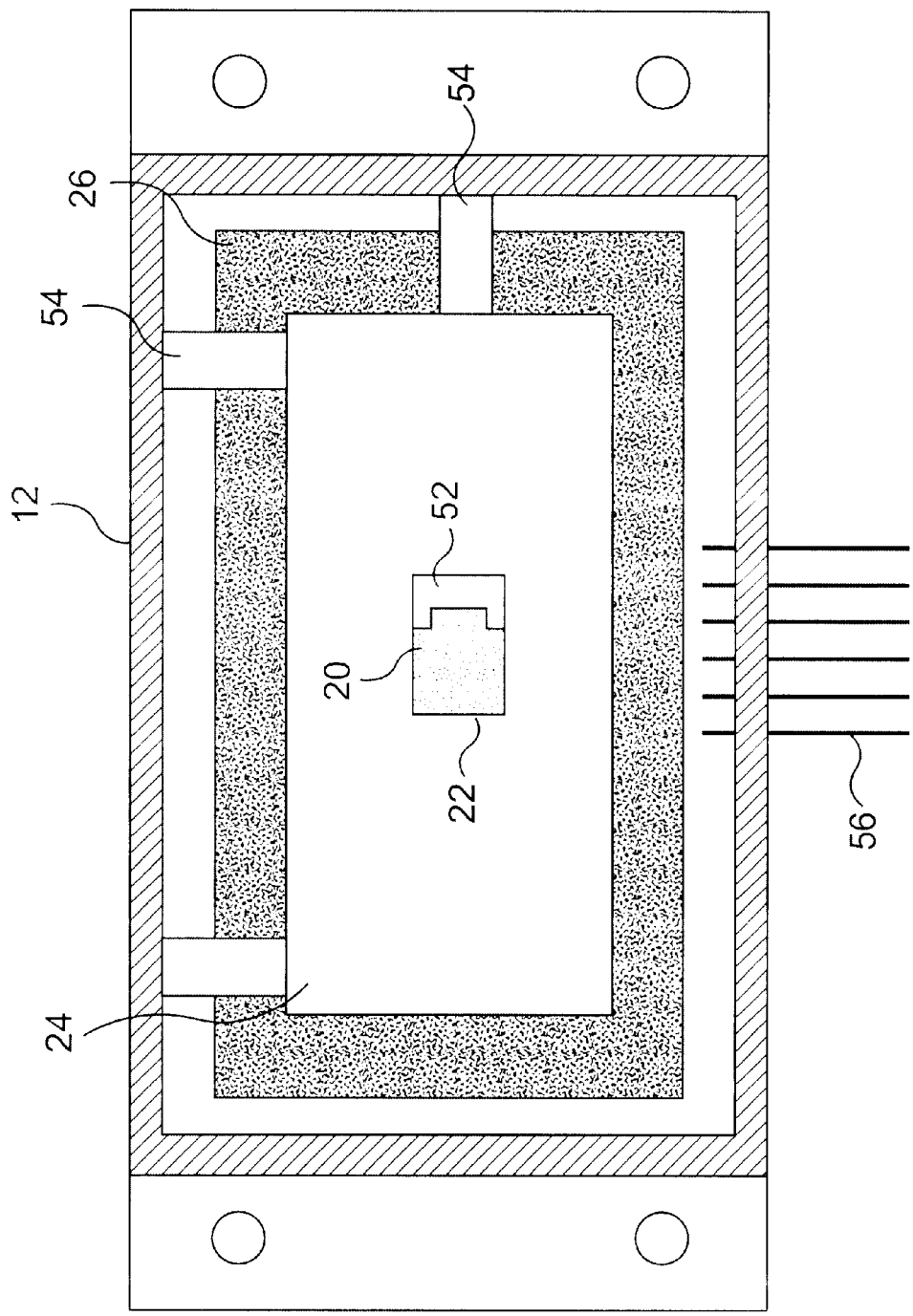
FIGS. 4a and 4b illustrate top views of a pump module without and with a lid, respectively, according to an embodiment of the present invention.
Figure 4B:
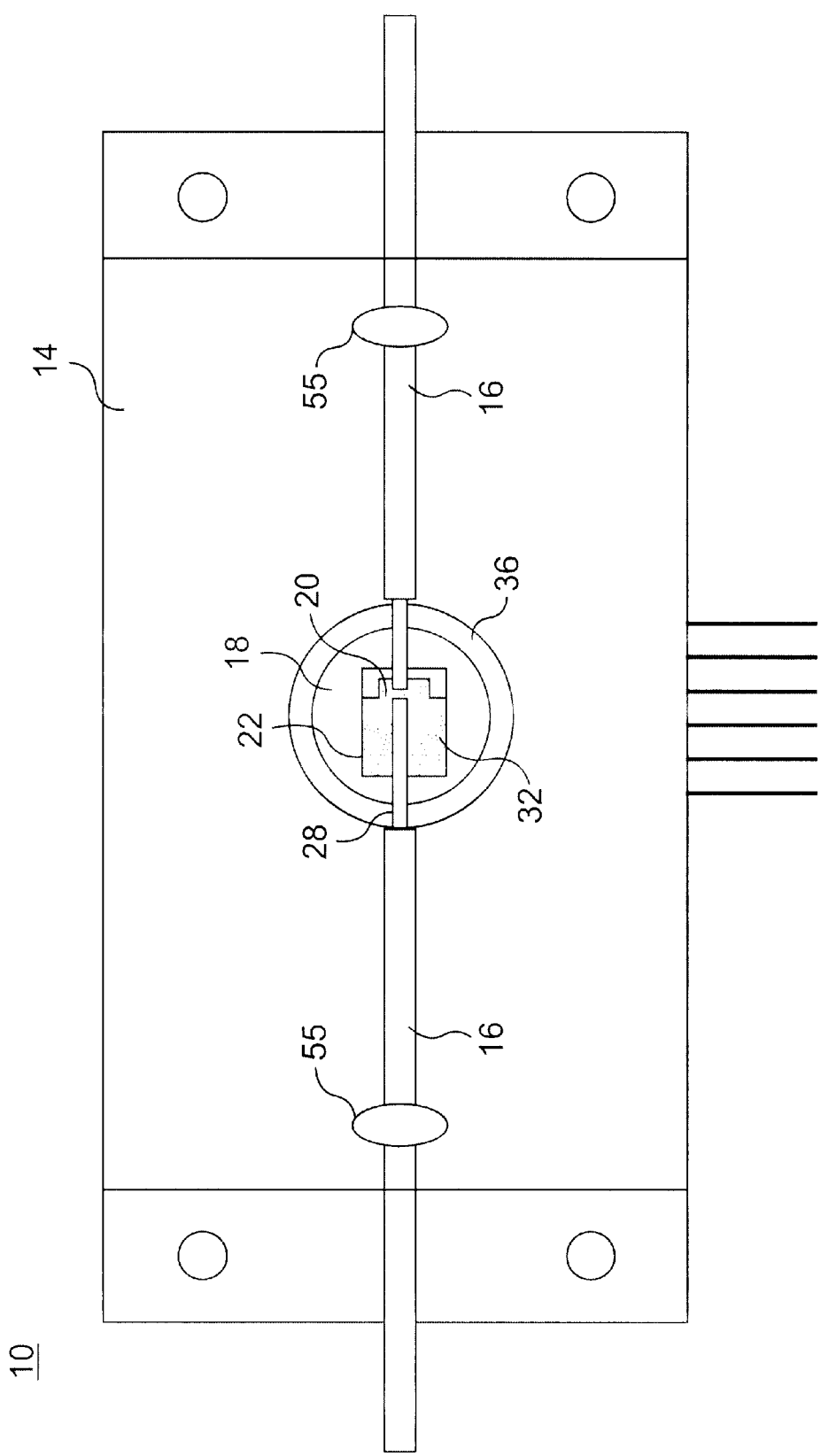

A top view of the hermetic pump module 10 is shown in FIGS. 4a (with the lid 14 removed) and 4b (with the lid 14 attached). In both figures, the outlines of the Peltier cooler 26, the heat spreader 24, and the laser diode 22 are seen. An alignment hole 52 milled into the heat spreader 24 is used to precisely position the laser diode 22 relative to the edges of the heat spreader 24. The heat spreader 24 is precisely positioned within the housing 12 using removable spacers 54, as shown in FIGS. 4a and 4b, or by some other means. The lid 14 fits on top of the housing 12 and the lid's 14 edges are aligned with the edges of the housing 12. The double cladding fiber 16 may be bonded to the top surface of the window 18, as discussed above. Using adhesive 55 or mechanical restraint (not shown), the double cladding fiber 16 is attached to the lid 14 in the area outside of the coupling region 30 and the raised lip ring 36. The v-groove 32 is fabricated in the double cladding fiber 16 either before or after the lid 14 is attached. The v-groove's 32 position along the fiber 16 is precisely controlled during the v-groove's 32 fabrication so that the v-groove's 32 apex is directly above the junction emission region of the laser diode 22. The electrical pins 56 shown are for providing electrical power to the laser diode 22.

The v-groove pumping method shown in FIGS. 2a–2b, and used in the fiber amplifiers and laser configurations described in this invention disclosure so far, directs approximately equal amounts of pump light in each direction along the double cladding fiber 16. In some cases it is more advantageous to couple the pump beam 34 uni-directionally into the double cladding fiber 16; first, uni-directional pumping allows the gain fiber 16 to be one half the length of the bi-directional pump case, and second, the pump intensity will be two times larger than with bi-directional pumping.

Figure 5A:
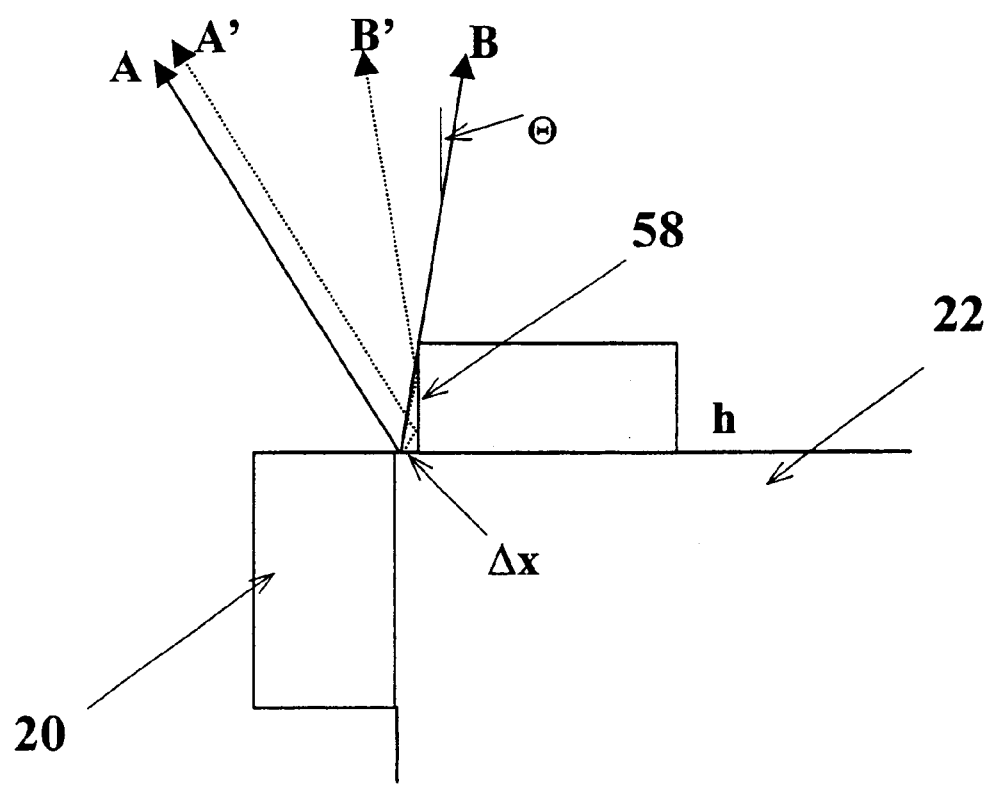
FIGS. 5a and 5b illustrate a cross-sectional side view of a configuration of a laser diode and a fiber for uni-directional pumping.
Figure 5B:
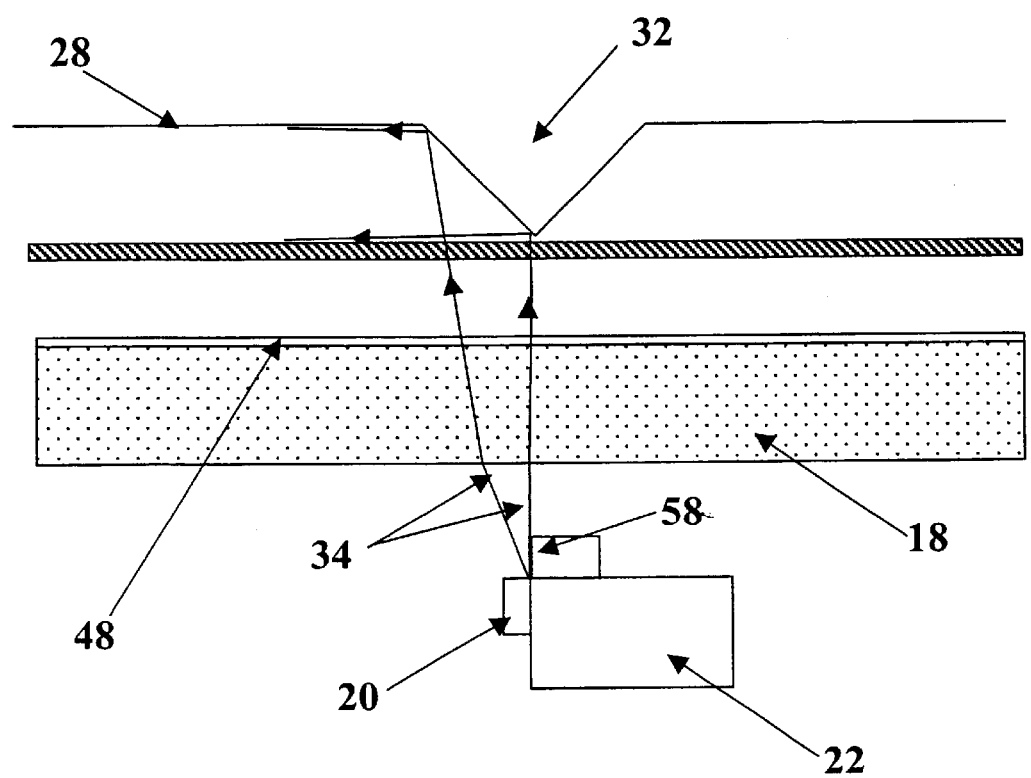

A method of converting bi-directional pumping arrangement of FIG. 1a into a uni-directional pumping arrangement is revealed in FIGS. 5a and 5b. In the uni-directional pumping arrangement, a small mirror 58 is placed on the diode heatsink 22 close to the diode junction emission region. The mirror 58 has a height h, and the surface of the mirror 58 is oriented perpendicular to the diode facet, and is positioned a distance of $\Delta x$ below the diode junction, as shown in the FIG. 5a. The light emitted by the diode 20 at negative angles, that is to the left of the vertical, misses the mirror 58 and freely diverges into the space beyond the mirror 58, as represented by rays A and B in FIG. 5a. Ray A represents the maximum divergence angle of light emitted by the diode 20, while ray B represents the maximum positive angle of rays not intercepted by the mirror 58. Light emitted at positive angles, that is to the right of the vertical, is intercepted by the mirror 58 for all angles greater than $\theta = \arctan(\Delta x/h)$, where the angle is referenced relative to the vertical. The angular range of reflected light is contained between rays A' and B' in FIG. 5a, where ray A' is parallel to ray A.

The reflected light propagates at negative angles as shown. For a mirror height of 50 $\mu$m and $\Delta x = 2$ $\mu$m, the intercept angle is $\theta = 2°$, which is within the angular range required for total internal reflection at the v-groove-air interface 60. As shown in FIG. 5b, the effect of the mirror 58 is to cause the entire pump beam 34 to be incident on one side of the v-groove 32, at angles which are negative or only 2–3 degrees positive, so that all of the pump beam 32 is coupled uni-directionally into the fiber 16.

Since the height h of the mirror 58 may be comparable to the diode facet-to-window spacing, the top surface of the mirror 58 may be in contact with the bottom surface of the window 18, so that the mirror 58 may serve as a spacer between the diode heatsink 22 and the window 18.

Figure 6:
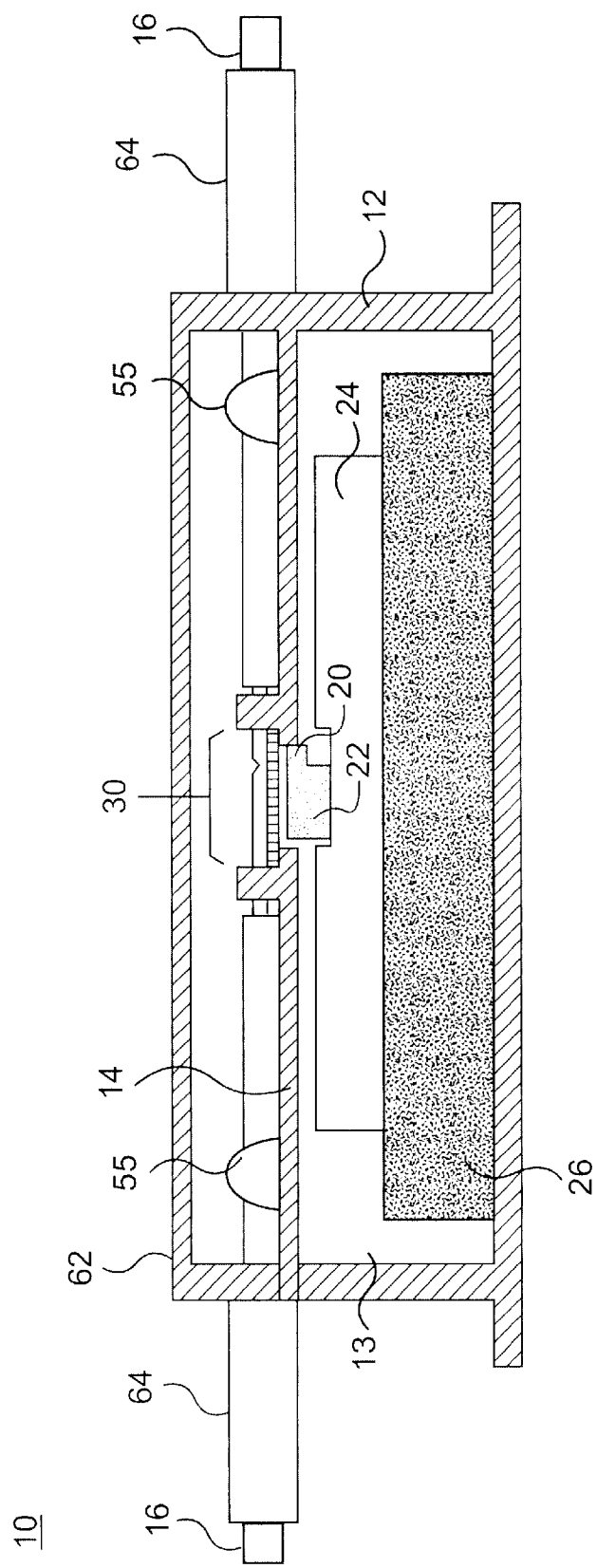
FIG. 6 illustrates a side-view of a pump module housing with a cap according to an embodiment of the present invention.

In addition to hermetically sealing the housing 12 which contains the diode 20, the coupling region 30 of the module 10, containing the stripped section of the fiber 16 and the v-groove 32 can be protected by placing a cap 62 on the top surface of the lid 14, as shown in FIG. 6. The cap 62 is bonded to the top of the lid 14 to provide a seal. Additionally, the fiber 16 may be sealed into ferrules 64, to relieve any strain on the fiber 16, attached to both ends of the cap 62.

The hermetic packaging method described above may also be used to construct fiber amplifiers or fiber lasers using the following two alternatives. In a first approach, the fiber 16 in the module 10 can be a doped double cladding gain fiber, with the remaining length of the gain fiber placed outside of the module 10. In a second approach, a length of undoped double cladding fiber is used inside the pump module 10 and extending a short distance outside. Lengths of doped double cladding gain fiber, optimized for a specific fiber amplifier or laser, could then be fusion spliced to both ends of the undoped fiber section. To improve the pump-coupling efficiency, an undoped fiber with a larger inner cladding size could be used for the pump coupling (i.e., in the coupling region 30) while a double cladding fiber with a small cladding diameter, required to achieve high pump absorption, could be used as the gain fiber. To achieve efficient pump power transfer from the coupling fiber into the gain fiber, double cladding fiber tapers can be used as described in applicants' U.S. patent application Ser. No. 09/722,271, entitled "Optical Fiber Amplifiers and Lasers and Optical Pumping Device Therefor" and filed Nov. 28, 2000, which is herein incorporated by reference.

An alternative method and apparatus according to the present invention uses a microlens (not shown) between the diode 20 and the window 18 to capture the pump beam 34 from the broad stripe diode 20 and focus the pump beam 34 on the v-groove 32. The lens could be placed inside the hermetic package 10, between the diode 20 and the window 18. Alternatively, another method would be to place the microlens outside the hermetic package 10, between the window 18 and a second substrate (not shown) that would support the fiber 16 with the v-groove 32.

Figure 7:
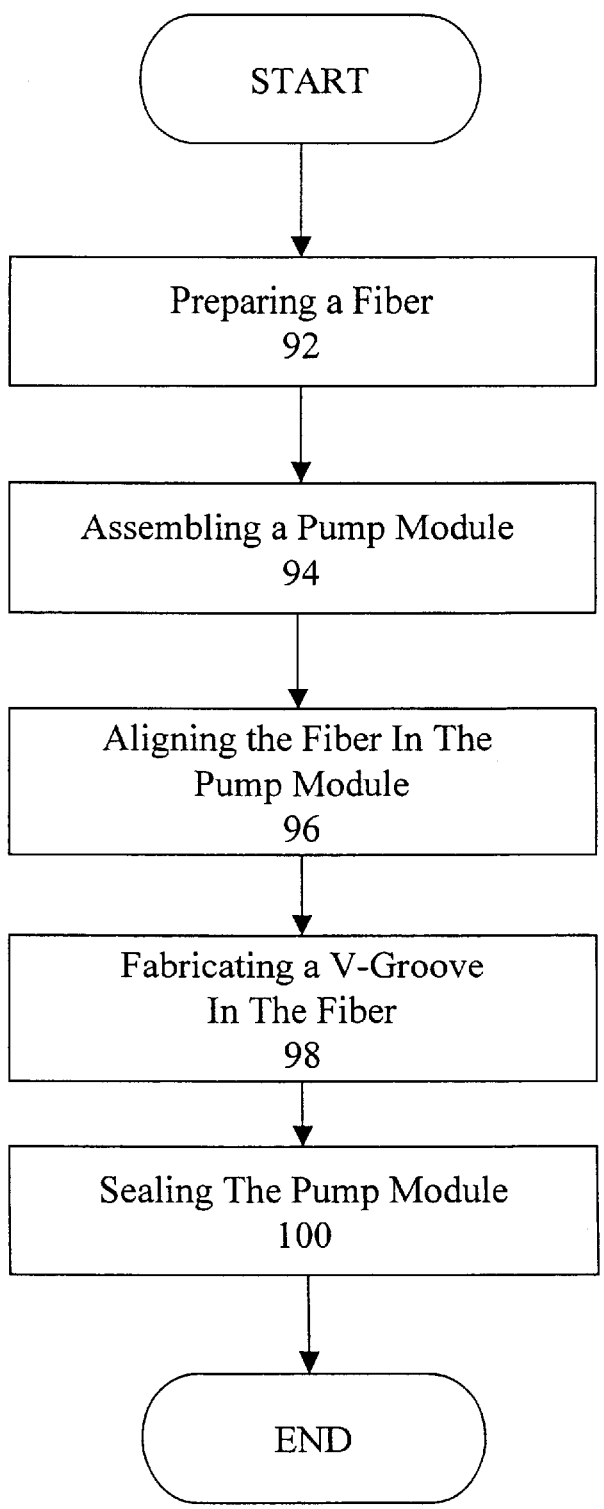
FIG. 7 illustrates a method according to an embodiment of the present invention.

FIG. 7 illustrates a method according to the present invention. The method comprises: preparing a fiber 92, assembling a pump module 94, aligning the fiber in the pump module 96, fabricating the v-groove in the fiber 98 and sealing the pump module 100. The method 90 may include more or less steps as illustrated by the description herein of various embodiments of the pump module 10. The preparing a fiber 92 may comprise stripping the outer cladding 27 from a section of a double cladding fiber 16, wherein the section corresponds to the window 18 of a pump module 10. The stripping of the outer cladding 27 may be accomplished using a chemical etching, laser ablation technique or other methods, as described in applicants' U.S. patent application Ser. No. 09/722,271, entitled "Optical Fiber Amplifiers and Lasers and Optical Pumping Device Therefor" and filed Nov. 28, 2000.

Assembling the pump module 94 may comprise placing the Peltier cooler 26 and the heat-spreading sub-mount 24 in the housing 12, placing the laser diode 20 and diode heatsink 22 on the sub-mount 24 (in the alignment hole 52 if one is present), placing the lid 14 on the housing 12 and placing the window 18 on the window support ledge 38. The lid 14 may be attached to the housing 12 with an adhesive while the window 18 may be bonded to the lid 14, as discussed above, in order to hermetically seal the housing 12. The aligning the fiber in the pump module 96 may comprise placing the stripped section of the fiber 16 in the slot 40 of the raised ring 36, centering the stripped section over the window 18 and bonding the striped section of the fiber 16 (i.e., the inner cladding 28) to the top surface of the window 18.

Fabricating the v-groove in the fiber 98 may comprise using a right-angle metal tool to polish the v-groove into the fiber 16 above the diode junction. The v-groove 32 may be aligned with the pump beam 34 by turning the laser diode 20 on, so that it emits the pump beam 34, and centering the v-groove 32 in the middle of the pump beam 34 light that enters the inner cladding 28. Sealing the pump module 100 may comprise the sealing of the housing 12 and the bonding of the inner cladding 28 to the top surface of the window 18 discussed above as well as bonding the jacket portion of the fiber 16 to the top surface of the lid 14 and/or placing a cap 62 on the lid 14. The cap 62 may be bonded to the lid 14.

Figure 8:
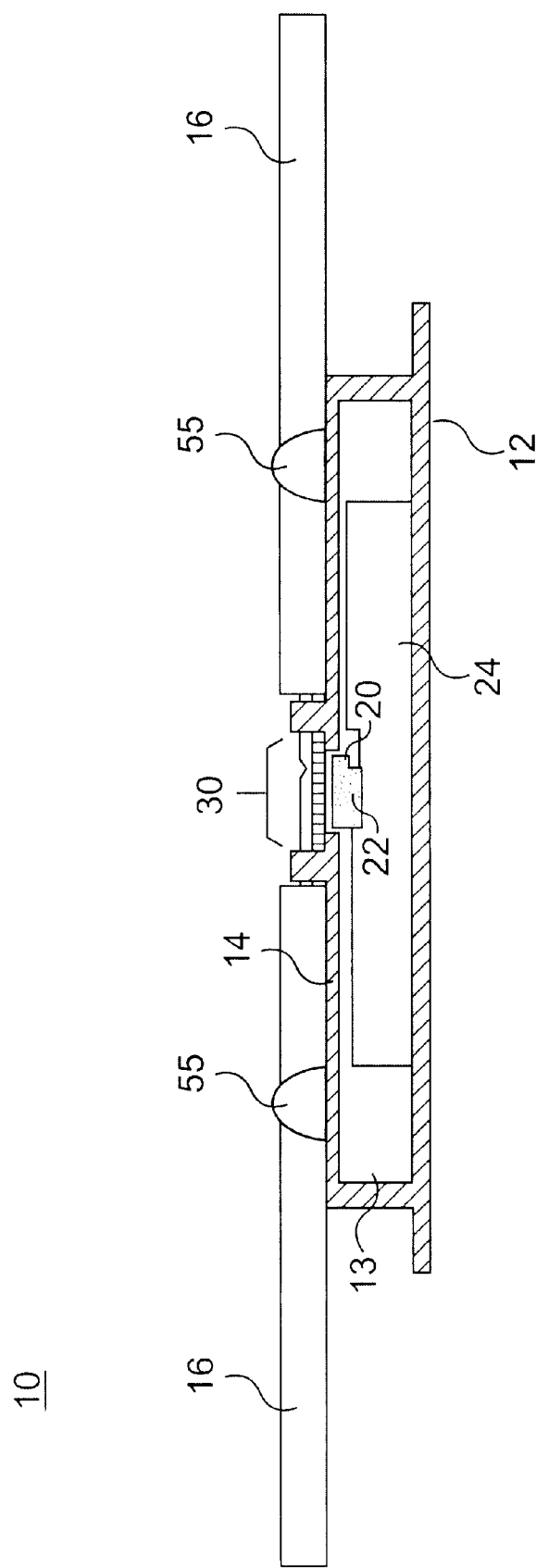
FIG. 8 illustrates a side-view of a pump module without a Peltier cooler according to an embodiment of the present invention.

In order to achieve a significant reduction in the amplifier cost it may be desirable to construct the pump module 10 without the Peltier thermoelectric cooler 26, as shown in FIG. 8. Typically, the Peltier thermoelectric cooler 26 is required to keep the temperature of the pump diode 20 within a few degrees of a set point. The allowed temperature variation is determined by the wavelength vs. temperature variation of the pump diode 20 and the spectral width of the absorption peak of the active dopant in the core of the fiber 16. If the active dopant is Er or Yb, the absorption peak width is approximately 10 nm wide (FWHM) for a pump light wavelength of approximately 980 nm. The absorption characteristics of an Er/Yb co-doped fiber are similar since the pump light is absorbed by the Yb ions. In a typical pump diode, the wavelength vs. temperature variation is approximately 0.2 nm/degree (Celsius), and the wavelength increases as the temperature gets hotter. In order to maintain constant amplifier output power, gain and noise characteristics the diode 20 temperature must be maintained within a sufficiently small range so that its pump wavelength changes by much less than the width of the absorption peak. Typically this requires a temperature stability of a few degrees, a range that is much smaller than the fluctuations in the ambient temperature present in most field installations.

Disclosed herein is a broad stripe laser diode 20 operating near 915 nm as the pump source in the lens-less amplifier pump module 10. The Yb absorption peak at 915 nm is approximately 60 nm wide, or a factor of 6× wider than that near 980 nm. Such a wide absorption peak makes the amplifier sufficiently insensitive to large temperature fluctuations so that active temperature control (i.e., the Peltier cooler 26) may be eliminated in most applications. In addition to the use of a pump diode 20 near 915 nm, multiple pump diodes at different wavelengths may be used. For example, by using one pump diode centered on the short wavelength side of the 915 nm absorption peak (e.g., 905 nm) and another on the long wavelength side (e.g., 925 nm), the effective temperature sensitivity is decreased. This can be seen from the fact that as the ambient temperature drops, the wavelength of the long wavelength diode emission decreases and its absorption increases, while absorption of the short wavelength pump diode emission decreases as its wavelength decreases. This self-compensating effect functions similarly when the temperature increases. Multiple diodes with different emission wavelengths can be incorporated in the bi-directional pumping amplifier design, where a pump module 10 is placed at each end of the gain fiber, or a multiple pump design where several diodes are placed in serial fashion along the gain fiber.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. A hermetically sealed fiber pump module comprising:
   a housing, wherein the housing comprises a cavity;
   a laser diode, situated within the cavity, wherein the laser diode emits a pump beam;
   a lid, connected to the housing and situated above the laser diode, wherein the lid encloses the laser diode within the cavity through the lid while allowing the pump beam to exit the cavity; and
   a double cladding fiber, comprising a outer cladding and an inner cladding, wherein the double cladding fiber is connected to the lid and the outer cladding is stripped from the double cladding fiber in a stripped section and the pump beam is side-coupled into the stripped section of the double-cladding fiber.

2. The pump module of claim 1, further comprising:
   a laser diode heat sink, connected to the laser diode; and
   a heat-spreading sub-mount situated within the cavity, wherein the laser diode and the laser diode heat sink are mounted on the heat-spreading sub-mount.

3. The pump module of claim 2, wherein the heat-spreading sub-mount comprises an alignment hole in which the laser diode and the laser diode heat sink are placed to properly align the laser diode.

4. The pump module of claim 1, further comprising:
   a Peltier cooler, bonded to the bottom of the housing, wherein the Peltier cooler maintains the laser diode temperature.

5. The pump module of claim 1, further comprising a transparent window, situated above the laser diode and bonded to the lid, wherein the pump beam exits the cavity through the transparent window.

6. The pump module of claim 5, wherein the transparent window is a material with a high refractive index n.

7. The pump module of claim 6, wherein the material is chosen from the following:
   sapphire, lead borosilicate glass, zinc sulfide, diamond or zinc selenide.

8. The pump module of claim 6, wherein n is greater than 1.5.

9. The pump module of claim 6, wherein the lid comprises a window support ledge that supports the window.

10. The pump module of claim 1, wherein the inner cladding in the stripped section comprises a v-groove that couples the pump beam into the inner cladding of the double cladding fiber.

11. The pump module of claim 10, further comprising:
    a transparent window, situated above the laser diode and bonded to the lid, wherein the pump beam exits the cavity through the transparent window and is coupled into the inner cladding of the double cladding fiber by the v-groove.

12. The pump module of claim 11, wherein the inner cladding in the stripped section of the double cladding fiber is mounted to the transparent window.

13. The pump module of claim 11, wherein the inner cladding in the stripped section of the double cladding fiber is bonded to the transparent window with a low refractive index adhesive.

14. The pump module of claim 11, wherein the transparent window has a thickness, is made from a material and is placed a distance above the laser diode so that a coupling efficiency between the pump beam and the inner cladding is at least 80%.

15. The pump module of claim 11, wherein the transparent window has a thickness has a thickness of 175 $\mu$m or less, a refractive index of greater than 1.5 and is placed 50 $\mu$m or less above the laser diode.

16. The pump module of claim 11, wherein the stripped section of the double cladding fiber is bonded to the transparent window with a transparent adhesive.

17. The pump module of claim 1, wherein the lid comprises:
    a raised ring, circling the window and the laser diode, the raised ring comprising:
       a pair of fiber alignment slots on opposite sides of the raised ring, wherein the fiber alignment slots receive the inner cladding in the stripped section of the double cladding fiber and align the inner cladding above the laser diode.

18. The pump module of claim 1, wherein the double cladding fiber comprises an undoped core.

19. The pump module of claim 1, wherein the laser diode is a broad stripe laser diode operating near 915 nm and the pump module is sufficiently insensitive to large temperature fluctuations so that active temperature control is avoided.

20. The pump module of claim 1, further comprising a cap, connected to the lid, that encloses at least the stripped section of the double cladding fiber and the transparent window.

21. The pump module of claim 1, wherein the double cladding fiber is continuous through the pump module.

22. A hermetically sealed fiber pump module comprising:

a housing, wherein the housing comprises a cavity;

a laser diode, situated within the cavity, wherein the laser diode emits a pump beam;

a transparent window, situated above the laser diode, wherein the pump beam exits the cavity through the transparent window; and a double cladding fiber, comprising a outer cladding and an inner cladding, wherein the outer cladding is stripped from the double cladding fiber in a stripped section and the inner cladding in the stripped section is situated on the transparent window.

23. The pump module of claim 22, wherein the inner cladding in the stripped section comprises a v-groove that couples the pump beam into the inner cladding of the double cladding fiber.

24. The pump module of claim 23, wherein the pump beam is incident on both sides of the v-groove and the pump module is a bi-directional pump.

25. The pump module of claim 23, further comprising a mirror, located on the laser diode and positioned to reflect the pump beam so that it is incident on one side of the v-groove and so the pump module is a unidirectional pump.

26. The pump module of claim 23, wherein the inner cladding where the v-groove is located in the stripped section has a larger diameter that tapers away from the v-groove.

27. The pump module of claim 22, wherein the inner cladding in the stripped section is bonded to the transparent window with a low refractive index adhesive.

28. The pump module of claim 22, wherein the laser diode is chosen so that the pump module is sufficiently insensitive to large temperature fluctuations so that active temperature control is avoided.

29. The pump module of claim 28, wherein the laser diode is a broad stripe laser diode operating near 915 nm.

30. The optical fiber device of claim 33, wherein the optical fiber device is a fiber laser.

31. The pump module of claim 22, further comprising a cap that encloses at least the stripped section of the double cladding fiber and the transparent window.

32. The pump module of claim 22, wherein the double cladding fiber is continuous through the pump module.

33. An optical fiber device comprising:

a hermetically sealed pump module, comprising:

a housing, wherein the housing comprises a cavity;

a laser diode, situated within the cavity, wherein the laser diode emits a pump beam; and a transparent window, wherein the outer cladding is stripped from the double cladding fiber in a stripped section and the inner cladding in the stripped section is bonded to the transparent window situated above the laser diode and enclosing the laser diode in the cavity, wherein the pump beam exits the cavity through the transparent window; and a doped double cladding gain fiber, comprising an outer cladding and an inner cladding, wherein a portion of the gain fiber is contained within the pump module and is situated on the transparent window.

34. The optical fiber device of claim 33, wherein the optical fiber device is a fiber amplifier.

35. The optical fiber device of claim 33, wherein the double cladding fiber is continuous through the pump module.

36. An optical fiber device comprising:

a hermetically sealed pump module, comprising:

a housing, wherein the housing comprises a cavity;

a laser diode, situated within the cavity, wherein the laser diode emits a pump beam; and a transparent window, situated above the laser diode and enclosing the laser diode in the cavity, wherein the pump beam exits the cavity through the transparent window; and an undoped double cladding fiber, comprising an outer cladding and an inner cladding, wherein a portion of the inner cladding fiber is contained within the pump module and is situated on the transparent window.

37. The optical fiber device of claim 36, wherein doped double cladding gain fiber is fusion spliced to an end of the undoped fiber extending outside the pump module.

38. The optical fiber device of claim 37, wherein the optical fiber device is a fiber amplifier.

39. The optical fiber device of claim 37, wherein the optical fiber device is a fiber laser.

40. The optical fiber device of claim 36, wherein the double cladding fiber is continuous through the pump module.

41. A method of assembling a hermetically sealed pump module, comprising:

preparing a fiber;

assembling a pump module, wherein the pump module comprises a laser diode that emits a pump beam and a window through which the pump beam passes;

aligning the fiber in pump module, wherein a portion of the fiber is attached to the window;

fabricating the v-groove in the fiber, wherein the v-groove is aligned above the diode; and sealing the pump module, wherein the sealed pump module hermetically seals the laser diode within a housing.

42. The method of claim 41, wherein the fiber is a double cladding fiber comprising an outer cladding and an inner cladding, and the preparing comprises stripping the outer cladding from a stripped section.

43. The method of claim 42, wherein the fabricating a v-groove comprises cutting the v-groove in the inner cladding in the stripped section.

44. The method of claim 41, wherein the assembling the pump module comprises placing the laser diode within the housing, placing a lid over the housing, placing a transparent window on the lid over the laser diode, bonding the lid to the housing and bonding the window to the lid.

45. The method of claim 44, wherein the aligning the fiber in pump module comprises positioning the stripped section on the window.

46. The method of claim 45, wherein the sealing the pump module comprises bonding the inner cladding in the stripped section to the window with a low refractive index adhesive.

47. The method of claim 41, wherein the assembling the pump module comprises inserting spacers into the housing.

* * * * *